(12) United States Patent
Natali

(10) Patent No.: US 8,997,629 B2
(45) Date of Patent: Apr. 7, 2015

(54) PNEUMATIC ACTUATOR

(75) Inventor: Gianfranco Natali, Sorengo (CH)

(73) Assignee: Faist Ltd (Holdings), London (GB)

( * ) Notice: Subject to any disclaimer, the term of this patent is extended or adjusted under 35 U.S.C. 154(b) by 961 days.

(21) Appl. No.: 12/988,237

(22) PCT Filed: Mar. 29, 2010

(86) PCT No.: PCT/IB2010/051361
§ 371 (c)(1),
(2), (4) Date: Oct. 25, 2010

(87) PCT Pub. No.: WO2010/113104
PCT Pub. Date: Oct. 7, 2010

(65) Prior Publication Data
US 2011/0030369 A1     Feb. 10, 2011

(30) Foreign Application Priority Data
Mar. 31, 2009   (IT) ............................... VR2009A0042

(51) Int. Cl.
*G01D 5/14*     (2006.01)
(52) U.S. Cl.
CPC ...................... *G01D 5/145* (2013.01)
(58) Field of Classification Search
CPC ...................................... G01D 5/145
USPC ........................................... 92/5 R
See application file for complete search history.

(56) References Cited

U.S. PATENT DOCUMENTS

| 5,150,049 | A  | * | 9/1992  | Schuetz ........................ 92/5 R |
| 6,639,398 | B2 |   | 10/2003 | Genot et al. |
| 7,044,444 | B2 |   | 5/2006  | Haubold et al. |
| 7,170,278 | B2 | * | 1/2007  | Wohner ........................ 92/5 R |
| 7,199,578 | B2 |   | 4/2007  | Rohner et al. |
| 7,423,421 | B2 |   | 9/2008  | Reichert et al. |

(Continued)

FOREIGN PATENT DOCUMENTS

| DE | 43 03 403 A1 | 8/1993 |
| DE | 10 2005 007561 A1 | 8/2006 |
| DE | 10 2005 029904 A1 | 1/2007 |

(Continued)

*Primary Examiner* — F. Daniel Lopez
(74) *Attorney, Agent, or Firm* — Pearne & Gordon LLP

(57) ABSTRACT

A pneumatic actuator comprises a containment jacket (2) and an activating bar (14) mounted through the containment jacket (2) and able to move between a first operating position and a second operating position. The actuator (1) also comprises a fixed part (23) integral with the jacket (2) having a main axis of extension (X), and a mobile part (26) slidably connected to the fixed part (23), and operatively connected to the activating bar (14) in such a way that it moves with the bar. The fixed part (23) also comprises at least a core (25) made of ferromagnetic material extending along the axis (X). Two magnets (29) are attached to the mobile part (26) on diametrically opposite sides relative to the main axis of extension (X). The mobile part (26) can also move relative to the fixed part (23) between a first position of maximum magnetic uncoupling between the magnets (29) and the ferromagnetic core (25), and a second position of maximum magnetic coupling between the magnets (29) and the ferromagnetic core (25). Finally, a sensor (30) for detecting the magnetic field is mounted at one end of the ferromagnetic core (25).

22 Claims, 4 Drawing Sheets

(56) References Cited

U.S. PATENT DOCUMENTS

| | | |
|---|---|---|
| 2004/0189284 A1 | 9/2004 | Haubold et al. |
| 2005/0248337 A1 | 11/2005 | Rohner et al. |
| 2006/0208724 A1 | 9/2006 | Reichert et al. |
| 2006/0213365 A1* | 9/2006 | Dorr .............................. 92/5 R |

FOREIGN PATENT DOCUMENTS

| | | |
|---|---|---|
| DE | 10 2006 021130 B3 | 8/2007 |
| DE | 102006048084 A1 | 4/2008 |
| EP | 1 445 494 A2 | 8/2004 |
| WO | 03/093769 A1 | 11/2003 |

* cited by examiner

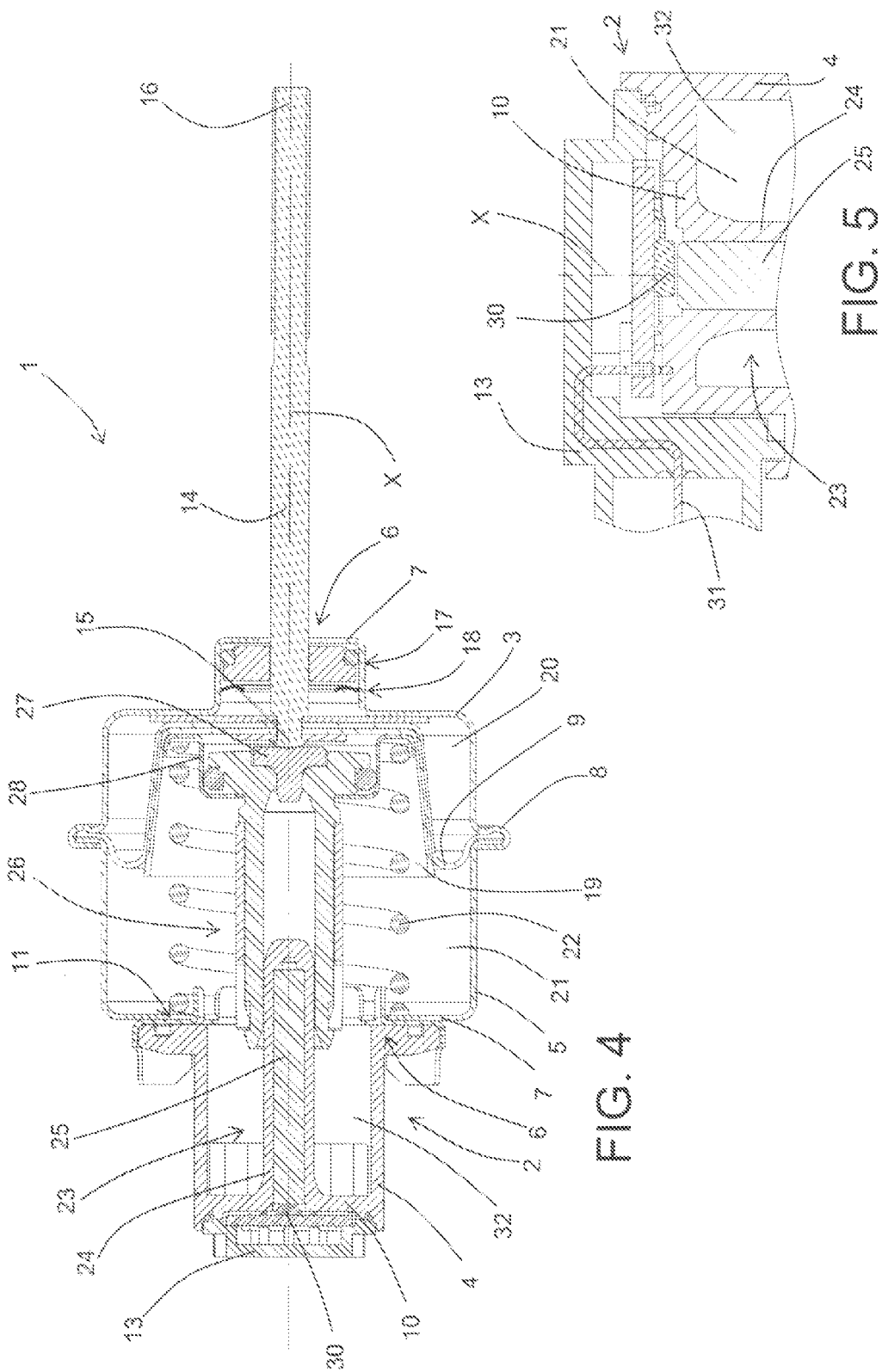

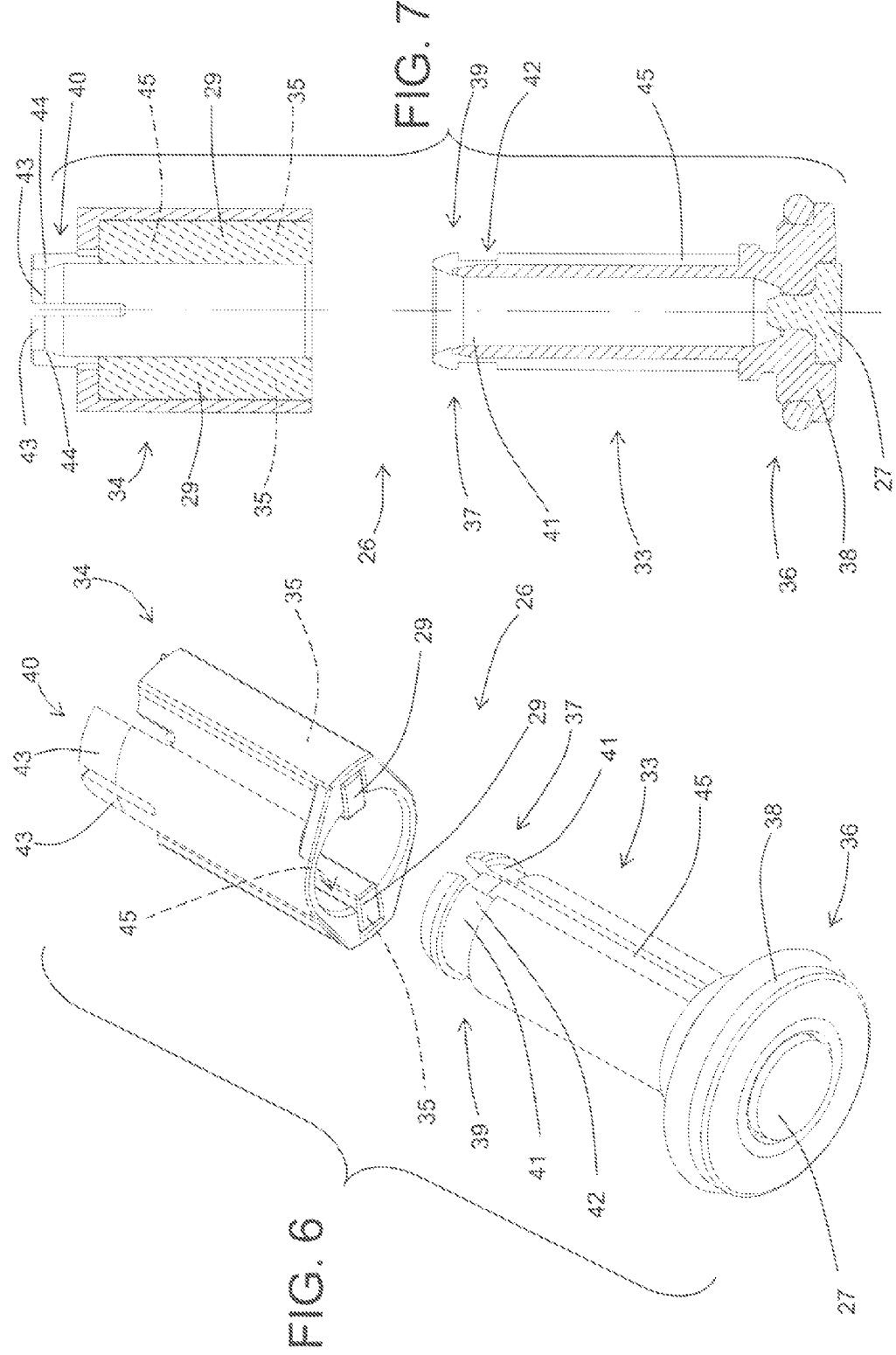

PNEUMATIC ACTUATOR

This invention relates to a pneumatic actuator, in particular intended for use in vehicle internal combustion engines and even more particularly for controlling turbo-compressors.

Pneumatic actuators are devices which have a containment jacket the inside of which forms a chamber divided into two further chambers by a gas-tight membrane. Attached to the membrane there is a first end of an activating bar which extends through the jacket and which has a second end which in practice is connected to the device to be controlled (such as the turbo-compressor).

One of the two inner chambers of the actuator also comprises a nozzle through which its internal pressure can be varied (generating an overpressure or a vacuum). In this way, both the membrane and the end of the bar integral with it are moved.

To control the position of the bar, prior art actuators also comprise suitable detector means which may have different forms, depending on requirements. One example of such detector means is given in Italian patent number 1354723.

In this case the detector means comprise a rheostat whose fixed part is integral with the containment jacket and whose slider is attached to a mobile part integral with the membrane. Therefore, to determine the position of the bar it is sufficient to measure the instantaneous resistance of the rheostat, since each movement of the membrane corresponds to a movement of the rheostat slider.

However, this prior art solution has several disadvantages. First, it requires the production of an electrical circuit which must cover both fixed and mobile parts, with a consequent complication of construction and a relatively high corresponding production cost, due to the need for a high level of precision during both the processing and assembly steps. Secondly, the use of sliding contacts brings the disadvantage that such contacts are always subject to wear as time passes (in particular in harsh operating conditions). It should also be noticed that there are also prior art detectors for measuring linear movements based on detection of a magnetic field. Said detectors, which therefore do not require electrical sliding contacts, normally comprise a magnet which is integral with a mobile element, and a sensor (for example a Hall effect sensor) which is integral with the fixed part. Movement of the magnet relative to the sensor varies the intensity of the magnetic field present at the sensor and so allows the position of the mobile element to be determined based on what the sensor detects.

An example of that type of detector is described in U.S. Pat. No. 6,639,398.

In this case the detector comprises a magnet (having an annular shape) which can be associated with the mobile element whose position is to be determined and slidably mounted on a guide rod made of ferromagnetic material. At the end of the rod there is a Hall effect sensor, whilst the magnet is inserted in a tube which is also made of ferromagnetic material. The detector also comprises a flux concentrating element made of ferromagnetic material, which is connected to the end of the tube opposite the end in which the magnet is inserted, and designed to convey the magnetic flux onto the sensor on the opposite side to the ferromagnetic core.

However, this type of detector also has several disadvantages.

First, these detectors are unable to supply a sufficiently linear variation of the magnetic field at the sensor after the movement of the magnet. Consequently, in order to be used they require preliminary calibration which allows a correspondence between what is measured by the sensor and the position of the magnets to be established. As a result, in order to be used such detectors must be connected to an electronic control unit able to calculate the position based on the sensor reading and previously saved mapping.

Second, the need to use annular magnets means a high production cost as well as significant difficulty magnetizing them in the radial direction in a uniform way.

In this situation the technical purpose which forms the basis of this invention is to provide pneumatic actuator which overcomes the above-mentioned disadvantages.

In particular the technical purpose of this invention is to provide a pneumatic actuator which is relatively simple to make and which supplies a sufficiently linear reading based on the movement of the activating bar.

The technical purpose specified and the aims indicated are substantially achieved by a pneumatic actuator as described in the appended claims.

Further features and the advantages of this invention are more apparent in the detailed description of a preferred, non-limiting embodiment of a is pneumatic actuator illustrated in the accompanying drawings, in which:

FIG. 4 shows the actuator of FIG. 1 according to the line IV-IV;

FIG. 5 is an enlarged view of a detail of the actuator of FIG. 2;

FIG. 6 is an axonometric partly exploded view of a detail of the actuator according to this invention; and FIG. 7 is an axial section of the detail of FIG. 6.

Figure 1:
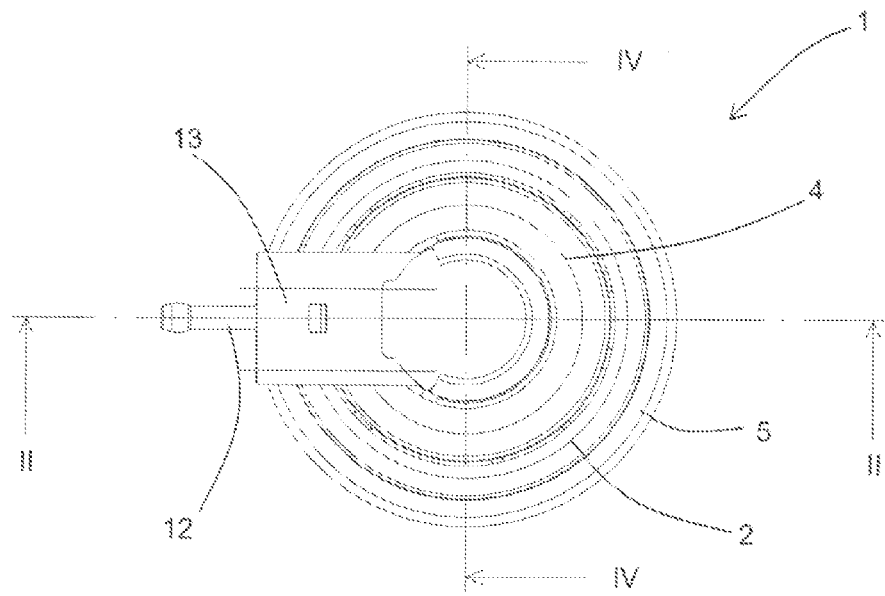
FIG. 1 is a top view of an actuator made in accordance with this invention.
Figure 3:
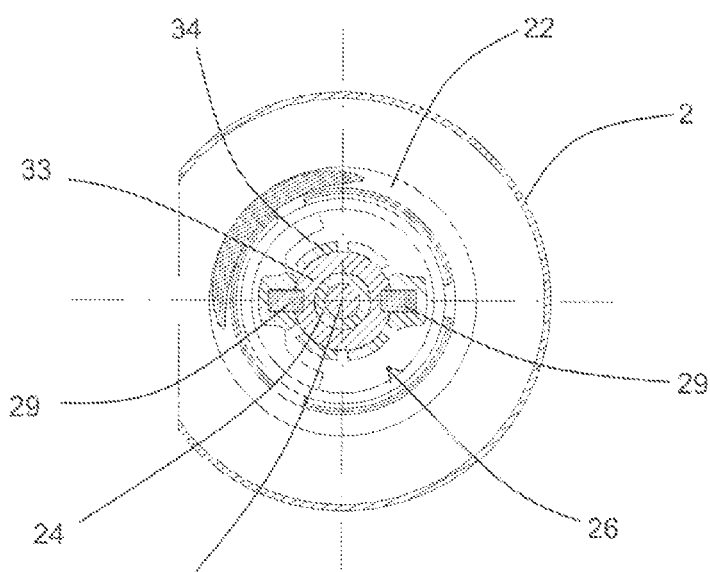
FIG. 3 shows the actuator of FIG. 2 according to the line III-III.

With reference to the accompanying drawings the numeral 1 denotes as a whole a pneumatic actuator made in accordance with the present invention. The actuator 1 comprises a containment jacket 2 which in the embodiment illustrated consists of three main bodies which, with reference to the orientation of FIG. 2, may be defined as a lower body 3, and upper body 4 and an intermediate body 5.

The lower body 3 and the intermediate body 5 substantially comprise respectively a first bell-shaped element and a second bell-shaped element, each having a through-hole 6 through the base 7. The first bell-shaped element and the second bell-shaped element are coupled in a sealed fashion at the respective free edge 8 and mounted between them, also in a fluid-tight fashion, there is a rolling membrane 9 (described in more detail below).

In turn the upper body 4 comprises a third bell-shaped element with a closed base 10 and whose free edge 11 is attached in a sealed fashion to the through-hole 6 of the second bell-shaped element.

The containment jacket 2 also comprises a nozzle 12 in fluid communication with the inside of the intermediate body 5, and an electrical connection element 13 attached on the outside of the upper body 4.

Through the through-hole 6 in the first bell-shaped element, an activating bar 14 is slidably inserted, the bar having a first end 15 located inside the containment jacket 2 and integral with the rolling membrane 9, and a second end 16 which in practice can be connected to the device to be controlled (such as the turbo-compressor).

Moreover, the bar 14 can move between a first operating position of maximum extension outside the containment jacket 2 and a second operating position of maximum retraction inside the containment jacket 2.

Inside the lower body 3 there are suitable guiding and centering means 17 and sealing means 18.

Also attached to the first end 15 of the bar 14 and to the rolling membrane 9 there is a rigid cup-shaped element 19 which, in practice, acts as a guide for deformation of the rolling membrane 9. Moreover, the latter divides the space inside the containment jacket 2 into two separate chambers, a lower chamber 20 and an upper chamber 21 (again with reference to the orientation of FIG. 2). The upper chamber 21 is in fluid communication with the nozzle 12 which allows variation of its internal pressure (reducing it in the embodiment illustrated) so as to cause a movement of the rolling membrane 9 (upwards in FIG. 2).

The movement of the rolling membrane 9 and the bar 14 is opposed by elastic means 22 mounted in the upper chamber 21 (a spring in the accompanying drawings) and acting on the rolling membrane 9 and the bar 14 to push the bar 14 towards its first operating position.

Figure 2:
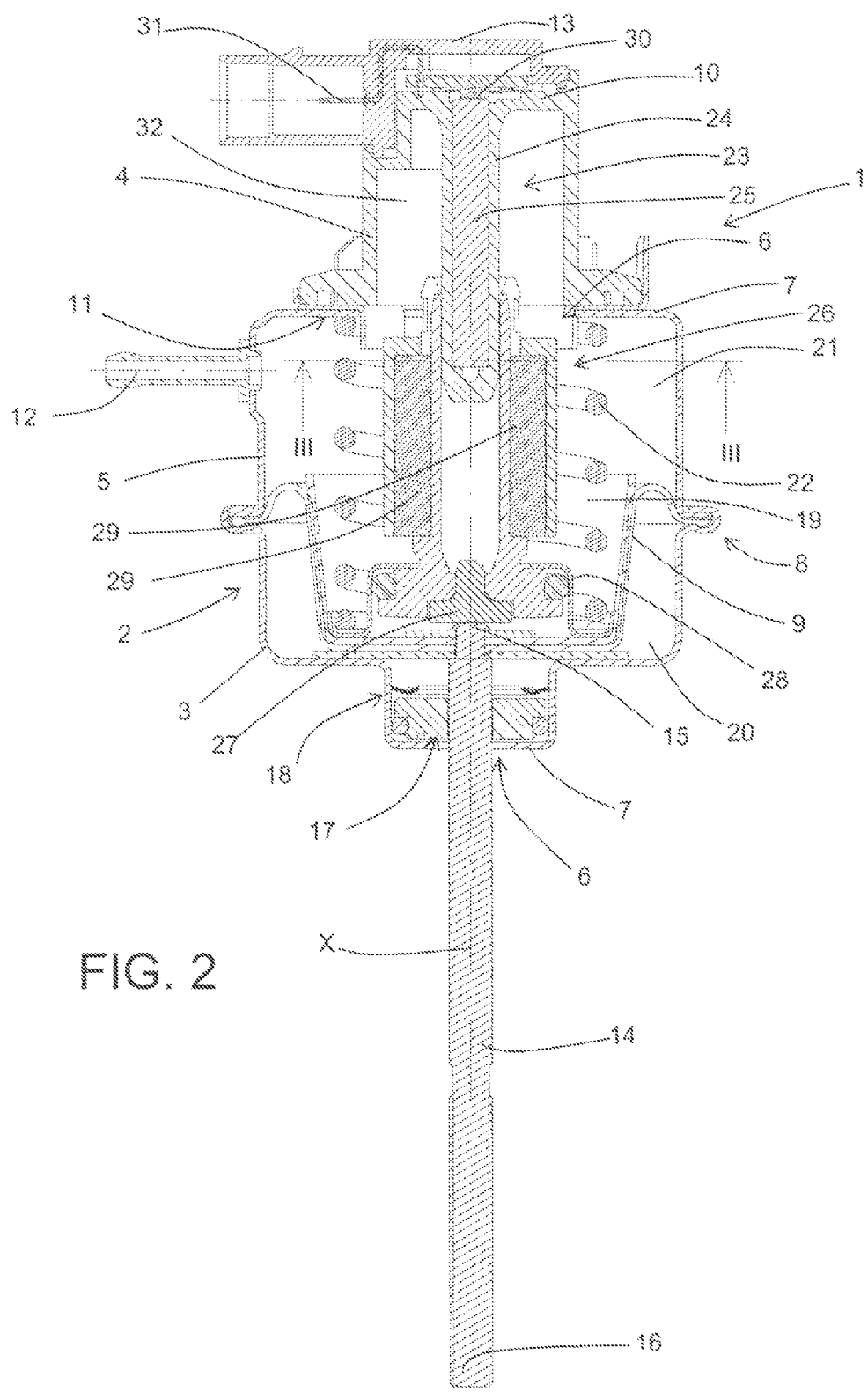
FIG. 2 shows the actuator of FIG. 1 according to the line II-II.

In accordance with this invention, the actuator 1 also comprises a fixed part 23 integral with the inside of the jacket 2 and having a shape extending along a main axis of extension X. As shown in FIG. 2, in the preferred embodiment the fixed part 23 is a rod 24 having a circular cross-section which is integral with the upper body 4 and extends towards the activating bar 14.

Moreover, the fixed part 23 comprises at least a core 25 made of ferromagnetic material, which, in the accompanying drawings, is inserted in the rod 24 from the outside of the upper body 4, and extends practically for the entire length of the rod 24.

Operatively connected to the fixed part 23 there is a mobile part 26 also mounted inside the containment jacket 2. In particular, the mobile part 26 is slidably mounted on the fixed part 23, and in particular on the rod 24. The mobile part 26 is operatively connected to the activating bar 14 in such a way that it moves with the latter. In the embodiment illustrated, this is achieved by having the activating bar 14 make contact with the mobile part 26, and in particular with a contact element 27 elastically connected to the mobile part 26, so as to absorb any transversal strains transmitted by the bar 14. Advantageously, the contact element 27 therefore comprises an insert made of elastically deformable material.

To guarantee contact between the mobile part 26 and the first end 15 of the activating bar 14, the elastic means 22 mounted in the containment jacket 2 also act on the mobile part 26. In the embodiment illustrated this is achieved by making the elastic means 22 act on a shaped rigid annular element 28 which is integral with the mobile part 26, projecting radially relative to it and resting in contact on the inner part of the cup-shaped element 19.

Also in accordance with this invention, attached on the mobile part 26 there are at least two magnets 29, advantageously substantially having the shape of parallelepipeds, which are mounted on diametrically opposed sides relative to the main axis of extension X of the fixed part 23. It should be noticed that each magnet 29 may be made either in a single piece, or by assembling two or more separate pieces.

Moreover, the magnets 29 have the same magnetic polarisation orientation (in the radial direction relative to the main axis of extension X), that is to say, they are arranged so that the respective faces facing each other have the same polarity, so as to generate a radial magnetic field relative to the main axis of extension X.

As already indicated, the mobile part 26 is slidably mounted on the fixed part 23, and can move relative to the latter between a first position of maximum magnetic uncoupling between the magnets 29 and the ferromagnetic core 25 (FIG. 2), and a second position of maximum magnetic coupling between the magnets 29 and the ferromagnetic core 25 (not illustrated).

As FIG. 2 shows, when the mobile part 26 is in the maximum uncoupling position, it is almost completely removed from the fixed part 23. In contrast, when the mobile part 26 is in the maximum coupling position, the fixed part 23 is completely inserted in it.

In the preferred embodiment, between the magnets 29 and the ferromagnetic core 25 there is always a gap (in the radial direction relative to the main axis of extension X), that is to say a certain distance. It should be noticed that for the purposes of this invention the term "gap" is used both when the distance between the magnets 29 and the core 25 is in air, and when it is filled with any non-ferromagnetic material (as in the case illustrated).

Preferably, for applications intended for controlling turbocompressors, the gap is less than 5 mm and it is preferably equal to around 3 mm.

Advantageously, the ferromagnetic core 25 and the magnets 29 are sized in such a way that the ratio between the length of the ferromagnetic core 25 and the length of each of the magnets 29 measured parallel with the main axis of extension X is between 1 and 2, and is preferably between 1.4 and 1.6.

As shown in the accompanying drawings, the dimension of each of the magnets 29 parallel with the main axis of extension X is preferably greater than the respective dimension in the radial direction relative to the main axis of extension X. Moreover, the dimension in the radial direction relative to the main axis of extension X is preferably greater than the dimension at a tangent to the main axis of extension X.

The actuator 1 comprises a sensor 30 for detecting the magnetic field, mounted at one end of the ferromagnetic core 25, and in particular at the end opposite that facing towards the activating bar 14.

Advantageously, the sensor 30 is a Hall effect sensor, and it is mounted in the electrical connection element 13 of the containment jacket 2. A suitable electrical connection 31 extends from the sensor 30 through the electrical connection element 13 so as to allow sensor 30 connection to an external processing unit.

The sensor 30 is preferably substantially aligned with the main axis of extension X of the fixed part 23, is transversal to it, and is physically not far from the ferromagnetic core 25.

Moreover, in accordance with the preferred embodiment of this invention, the actuator 1 is made in such a way that the distribution in space of the magnetic field generated by the magnets 29 is determined practically exclusively by the reciprocal position of the magnets 29 and the ferromagnetic core 25.

For this reason, the upper body 4 which forms, around the fixed part 23, a sliding chamber 32 for the mobile part 26, is advantageously substantially completely made of non-ferromagnetic material.

Similarly, both the rod 24 forming the outer containment casing of the ferromagnetic core 25, and the mobile part 26 are made of non-ferromagnetic material.

However, the whole actuator 1 is preferably made of non-ferromagnetic material (except the magnets 29 and the core 25).

Moreover, advantageously, the non-ferromagnetic materials used are mainly plastic materials.

As FIGS. 6 and 7 show, in the preferred embodiment the mobile part 26 advantageously comprises two concentric bushings 33, 34 mounted one on top of the other and between them forming two housings 35 in which the magnets 29 are inserted.

In particular, the mobile part 26 comprises an inner bushing 33 having a first end 36 closed by the contact element 27 and a second, open end 37 slidably mounted on the fixed part 23, and an outer bushing 34.

The first end 36 of the inner bushing 33 also comprises a widened head 38 on which the outer bushing 34 makes contact. In turn, the second end 37 of the inner bushing 33 comprises first coupling means 39 designed to couple with the second coupling means 40 which are integral with the outer bushing 34. In particular, the first coupling means 39 consist of two semi-cylindrical walls 41 each having a circumferential groove 42 on the outside, whilst the second coupling means 40 are a plurality of tabs 43 with an arc of a circle section, having radial coupling teeth 44 on their inner faces. An elastic deformation of the first coupling means and/or the second coupling means 40 allows the teeth 44 to be inserted in the grooves 43 in a snap-on fashion and locking of the outer bushing 34 on the inner bushing 33.

The housings 35 for the magnets 29 are advantageously made by bringing together opposite cavities 45 made on the inside of the outer bushing 34 and on the outside of the inner bushing 33.

Actuator 1 operation substantially corresponds to that of prior art actuators.

However, in this case the position of the activating bar 14 is detected by the sensor 30 for detecting the magnetic field which emits a signal proportional to the position of the mobile part 26 relative to the fixed part 23.

Thanks to this invention, said signal is substantially linear based on the movement of the mobile part 26, so that the relative positioning can be calculated with a simple formula, without the need for preliminary mapping and calibration.

For example, in accordance with this invention, it was possible to set up an actuator in which the linearity error of the magnetic field measurement detected by the sensor is less than 0.2%. In that actuator parallelepiped magnets with the dimensions 25×5×3 mm were used, together with a ferromagnetic core having a 5 mm diameter and 37 mm long, with a 3 mm plastic gap and a 20 mm stroke (all of the other parts of the actuator being made of non-ferromagnetic material, mainly plastic).

This invention brings important advantages.

The actuator made in accordance with this invention is first, easy to make since it has no sliding contacts and it uses two opposite magnets rather than a single annular magnet.

Moreover, as already indicated, the actuator made according to this invention supplies a signal indicating the position of the activating bar which varies in a practically linear way with variations in the position of the bar.

It should also be noticed that this invention is relatively easy to produce and that even the cost linked to implementing the invention is not very high, since the use of ferromagnetic material is minimised, there are no sliding contacts, and magnetizing of the magnets is very simple.

The invention described above may be modified and adapted in several ways without thereby departing from the scope of the inventive concept.

Moreover, all details of the invention may be substituted with other technically equivalent elements and in practice all of the materials used, as well as the shapes and dimensions of the various components, may vary according to requirements.

The invention claimed is:

1. A pneumatic actuator, comprising:
   a containment jacket (2) comprising a first bell-shaped element and a second bell-shaped element coupled in a sealed fashion at respective free edges;
   a rolling membrane (9) mounted in a fluid-tight fashion between the first bell-shaped element and the second bell-shaped element, the rolling membrane (9) dividing a space inside the containment jacket (2) into two separate chambers;
   an activating bar (14) slidably inserted through a through-hole (6) in the first bell-shaped element and having a first end (15) located inside the containment jacket (2) and engaged with the rolling membrane (9), and a second end (16) located outside the containment jacket (2), the activating bar (14) being able to move between a first operating position of maximum extension outside the containment jacket (2) and a second operating position of maximum retraction inside the containment jacket (2);
   elastic means (22) acting on the rolling membrane (9) and the activating bar (14) to push the activating bar (14) towards its first operating position;
   a fixed part (23) integral with the inside of the jacket (2) and having a shape extending along a main axis of extension (X);
   a mobile part (26) mounted inside the containment jacket (2), being slidably connected to the fixed part (23) and operatively connected to the activating bar (14) in such a way that it moves with the latter;
   the actuator being characterised in that the fixed part (23) also has at least a core (25) made of ferromagnetic material extending along the main axis of extension (X); and also being characterised in that it also comprises at least two magnets (29) fixed to the mobile part (26) and mounted on diametrically opposed sides relative to the main axis of extension (X) of the fixed part (23), said at least two magnets (29) having the same radial orientation of magnetic polarisation relative to the main axis of extension (X), said at least two magnets (29) being arranged so that their respective faces facing each other have the same polarity; also being characterised in that the mobile part (26) can move relative to the fixed part (23) between a first position of maximum magnetic uncoupling between the magnets (29) and the ferromagnetic core (25), and a second position of maximum magnetic coupling between the magnets (29) and the ferromagnetic core (25); and also being characterised in that it also comprises a sensor (30) for detecting a magnetic field mounted at one end of the ferromagnetic core (25), wherein the operating position of the activating bar (14) can be determined based on the magnetic field detected by the sensor (30).

2. The actuator according to claim 1, characterised in that the magnets (29) have the shape of parallelepipeds.

3. The actuator according to claim 2, characterised in that the containment jacket (2) has a portion forming a sliding chamber (32) for the mobile part (26) around the fixed part (23), said portion being made of non-ferromagnetic material.

4. The actuator according to claim 3, characterised in that the fixed part (23) comprises an outer containment casing for the ferromagnetic core (25), made of non-ferromagnetic material.

5. The actuator according to claim 2, characterised in that the magnets (29) and the ferromagnetic core (25) form a gap between them in the radial direction relative to the main axis of extension (X).

6. The actuator according to claim 2, characterised in that the activating bar (14) operates by making contact with the mobile part (26) and also being characterised in that the elastic means (22) is mounted in the containment jacket (2).

7. The actuator according to claim 1, characterised in that the containment jacket (2) has a portion forming a sliding chamber (32) for the mobile part (26) around the fixed part (23), said portion being made of non-ferromagnetic material.

8. The actuator according to claim 7, characterised in that the fixed part (23) comprises an outer containment casing for the ferromagnetic core (25), made of non-ferromagnetic material.

9. The actuator according to claim 1, characterised in that the mobile part (26) is made of non-ferromagnetic material.

10. The actuator according to claim 1, characterised in that the magnets (29) and the ferromagnetic core (25) form a gap between them in the radial direction relative to the main axis of extension (X).

11. The actuator according to claim 10, characterised in that the gap is less than 5 mm.

12. The actuator according to claim 1, characterised in that the activating bar (14) operates by making contact with the mobile part (26) and also being characterised in that the elastic means (22) is mounted in the containment jacket (2).

13. The actuator according to claim 12, characterised in that it has an element (27) for contact with the activating bar (14), the element being elastically connected to the mobile part (26) in such a way as to absorb transversal strains transmitted by the activating bar (14).

14. The actuator according to claim 1, wherein the ferromagnetic core (25) has a first end, which faces towards the activating bar (14) and can be inserted between said at least two magnets (29), and a second end that is opposite to the first end, the sensor (30) being mounted at the second end of the ferromagnetic core (25).

15. The actuator according to claim 14, wherein the sensor (30) is substantially aligned with the main axis of extension (X) of the fixed part (23).

16. A pneumatic actuator, comprising:
a containment jacket (2) comprising a first bell-shaped element and a second bell-shaped element coupled in a sealed fashion at respective free edges;
a rolling membrane (9) mounted in a fluid-tight fashion between the first bell-shaped element and the second bell-shaped element, the rolling membrane (9) dividing a space inside the containment jacket (2) into two separate chambers;
an activating bar (14) slidably inserted through a through-hole (6) in the first bell-shaped element and having a first end (15) located inside the containment jacket (2) and engaged with the rolling membrane (9), and a second end (16) located outside the containment jacket (2), the activating bar (14) being able to move between a first operating position of maximum extension outside the containment jacket (2) and a second operating position of maximum retraction inside the containment jacket (2);
elastic means (22) acting on the rolling membrane (9) and the activating bar (14) to push the activating bar (14) towards its first operating position;
a fixed part (23) integral with the inside of the jacket (2) and having a shape extending along a main axis of extension (X),
a mobile part (26) mounted inside the containment jacket (2), being slidably connected to the fixed part (23) and operatively connected to the activating bar (14) in such a way that it moves with the latter;
the actuator being characterised in that the fixed part (23) also has at least a core (25) made of ferromagnetic material extending along the main axis of extension (X); and also being characterised in that it also comprises at least two magnets (29) fixed to the mobile part (26) and mounted on diametrically opposed sides relative to the main axis of extension (X) of the fixed part (23), the magnets (29) having the same radial orientation of magnetic polarization relative to the main axis of extension (X); also being characterized in that the mobile part (26) can move relative to the fixed part (23) between a first position of maximum magnetic uncoupling between the magnets (29) and the ferromagnetic core (25), and a second position of maximum magnetic coupling between the magnets (29) and the ferromagnetic core (25); and also being characterized in that it also comprises a sensor (30) for detecting a magnetic field mounted at one end of the ferromagnetic core (25), wherein the operating position of the activating bar (14) can be determined based on the magnetic field detected by the sensor (30); and
wherein the pneumatic actuator has a ratio of between 1 and 2 between the length of the ferromagnetic core (25) and the length of each of the magnets (29) measured parallel with the main axis of extension (X).

17. The actuator according to claim 16, characterised in that the magnets (29) have the shape of parallelepipeds.

18. The actuator according to claim 16, characterised in that the ratio is between 1.4 and 1.6.

19. A pneumatic actuator, comprising:
a containment jacket (2) comprising a first bell-shaped element and a second bell-shaped element coupled in a sealed fashion at respective free edges;
a rolling membrane (9) mounted in a fluid-tight fashion between the first bell-shaped element and the second bell-shaped element, the rolling membrane (9) dividing a space inside the containment jacket (2) into two separate chambers;
an activating bar (14) slidably inserted through a through-hole (6) in the first bell-shaped element and having a first end (15) located inside the containment jacket (2) and engaged with the rolling membrane (9), and a second end (16) located outside the containment jacket (2), the activating bar (14) being able to move between a first operating position of maximum extension outside the containment jacket (2) and a second operating position of maximum retraction inside the containment jacket (2);
elastic means (22) acting on the rolling membrane (9) and the activating bar (14) to push the activating bar (14) towards its first operating position;
a fixed part (23) integral with the inside of the jacket (2) and having a shape extending along a main axis of extension (X);
a mobile part (26) mounted inside the containment jacket (2), being slidably connected to the fixed part (23) and operatively connected to the activating bar (14) in such a way that it moves with the latter;
the actuator being characterised in that the fixed part (23) also has at least a core (25) made of ferromagnetic material extending along the main axis of extension (X); and also being characterised in that is also comprises at least two magnets (29) fixed to the mobile part (26) and mounted on diametrically opposed sides relative to the main axis of extension (X) of the fixed part (23), the magnets (29) having the same radial orientation of magnetic polarization relative to the main axis of extension (X); also being characterized in that the mobile part (26) can move relative to the fixed part (23) between a first position of maximum magnetic uncoupling between the magnets (29) and the ferromagnetic core (25), and a second position of maximum magnetic coupling between the magnets (29) and the ferromagnetic core (25); and also being characterized in that it also comprises a sensor (30) for detecting a magnetic field mounted at one end of the ferromagnetic core (25), wherein the operating position of the activating bar (14) can be determined based on the magnetic field detected by the sensor (30); and wherein the dimension of each of the magnets (29) measured parallel with the main axis of extension (X) is greater than the dimension measured in the radial direction relative to the main axis of extension (X), the latter in turn being greater than the dimension measured tangentially relative to the main axis of extension (X).

20. The actuator according to claim 19, characterised in that the magnets (29) have the shape of parallelepipeds.

21. A pneumatic actuator, comprising:
  a containment jacket (2) comprising a first bell-shaped element and a second bell-shaped element coupled in a sealed fashion at respective free edges;
  a rolling membrane (9) mounted in a fluid-tight fashion between the first bell-shaped element and the second bell-shaped element, the rolling membrane (9) dividing a space inside the containment jacket (2) into two separate chambers;
  an activating bar (14) slidably inserted through a through-hole (6) in the first bell-shaped element and having a first end (15) located inside the containment jacket (2) and engaged with the rolling membrane (9), and a second end (16) located outside the containment jacket (2), the activating bar (14) being able to move between a first operating position of maximum extension outside the containment jacket (2) and a second operating position of maximum retraction inside the containment jacket (2);
  elastic means (22) acting on the rolling membrane (9) and the activating bar (14) to push the activating bar (14) towards its first operating position;
  a fixed part (23) integral with the inside of the jacket (2) and having a shape extending along a main axis of extension (X);
  a mobile part (26) mounted inside the containment jacket (2), being slidably connected to the fixed part (23) and operatively connected to the activating bar (14) in such a way that is moves with the latter;
  the actuator being characterised in that the fixed part (23) also has at least a core (25) made of ferromagnetic material extending along the main axis of extension (X); and also being characterized in that it also comprises at least two magnets (29) fixed to the mobile part (26) and mounted on diametrically opposed sides relative to the main axis of extension (X) of the fixed part (23), the magnets (29) having the same radial orientation of magnetic polarization relative to the main axis of extension (X); also being characterized in that the mobile part (26) can move relative to the fixed part (23) between a first position of maximum magnetic uncoupling between the magnets (29) and the ferromagnetic core (25), and a second position of maximum magnetic coupling between the magnets (29) and the ferromagnetic core (25); and also being characterized in that it also comprises a sensor (30) for detecting a magnetic field mounted at one end of the ferromagnetic core (25), wherein the operating position of the activating bar (14) can be determined based on the magnetic field detected by the sensor (30); and
  wherein the mobile part (26) consists of two concentric bushings between them forming two housings (35) in which the magnets (29) are inserted.

22. The actuator according to claim 21, characterised in that the magnets (29) have the shape of parallelepipeds.

* * * * *